United States Patent

[11] 3,602,026

| [72] | Inventors | Charles J. De Caro<br>Rockford;<br>Donald F. Coyne, Davis Junction, both of, Ill. |
|---|---|---|
| [21] | Appl. No. | 828,137 |
| [22] | Filed | May 27, 1969 |
| [45] | Patented | Aug. 31, 1971 |
| [73] | Assignee | Elco Industries, Inc.<br>Rockford, Ill. |

[54] PRODUCTION OF PREVAILING TORQUE THREADED FASTENING DEVICES
7 Claims, 12 Drawing Figs.

[52] U.S. Cl. ........................................... 72/90, 72/469
[51] Int. Cl. ........................................... B21h 3/06
[50] Field of Search ........................................... 72/88, 90, 469; 10/10, 87, 89

[56] References Cited
UNITED STATES PATENTS

| 2,284,659 | 6/1942 | Hosking | 72/88 |
| 3,044,329 | 7/1962 | Seibert | 72/90 |
| 3,452,375 | 7/1969 | Gabbey | 72/469 |
| 3,459,250 | 8/1969 | Tabor | 72/88 X |
| 3,481,380 | 12/1969 | Breed | 10/10 X |

*Primary Examiner*—Milton S. Mehr
*Attorney*—Pendleton, Neuman, Williams & Anderson ABSTRACT: Threaded fastening devices of preselected prevailing torque are produced on conventional thread rolling machines, including flat die and planetary die types, by providing opposed dies with parallel thread-forming grooves, at least one of said dies having provision for adjustably mounting a die insert with identical parallel thread-forming grooves and adjustment means for controlling the angular relationship of the respective thread-forming grooves of the die and die insert.

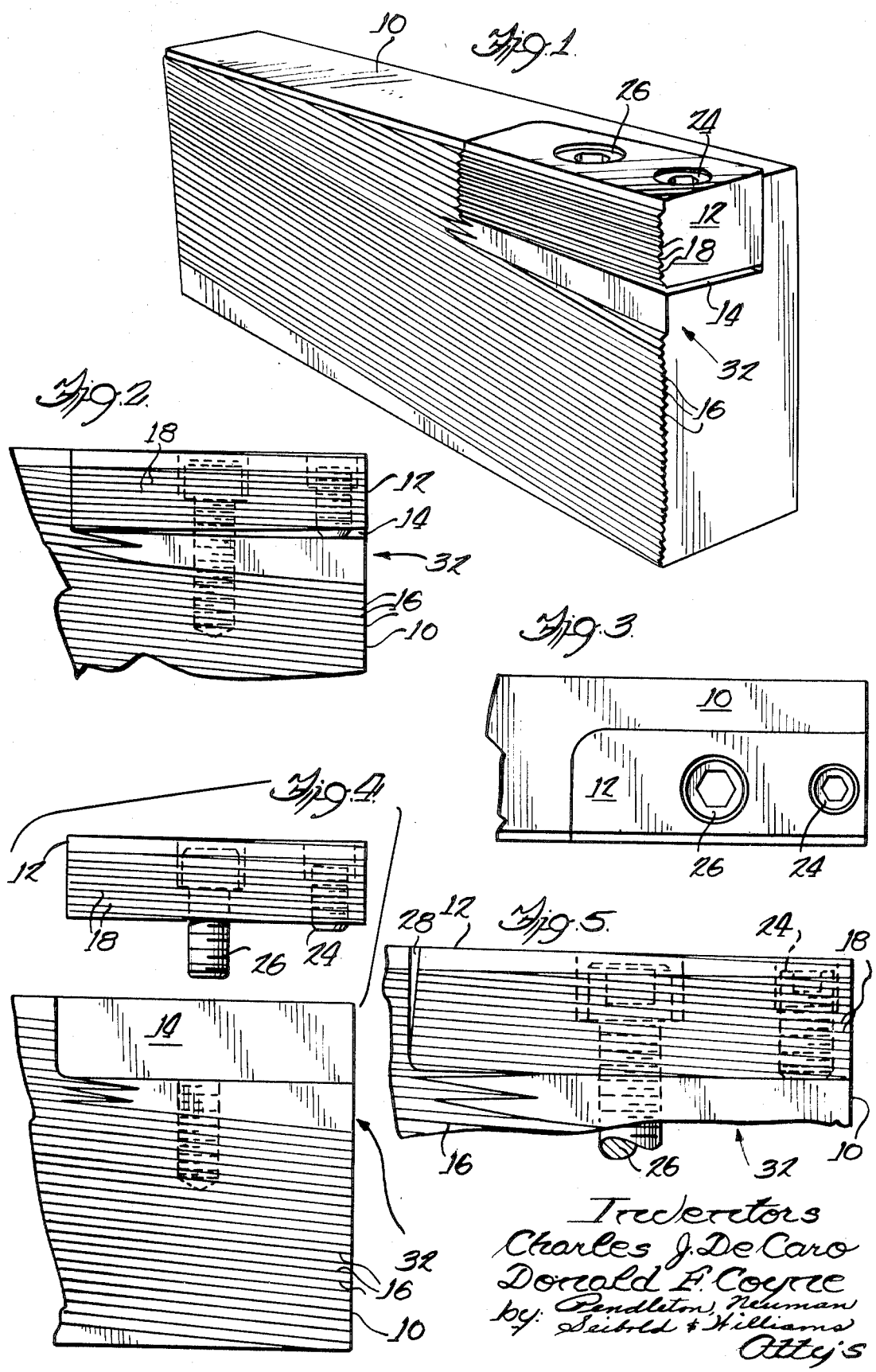

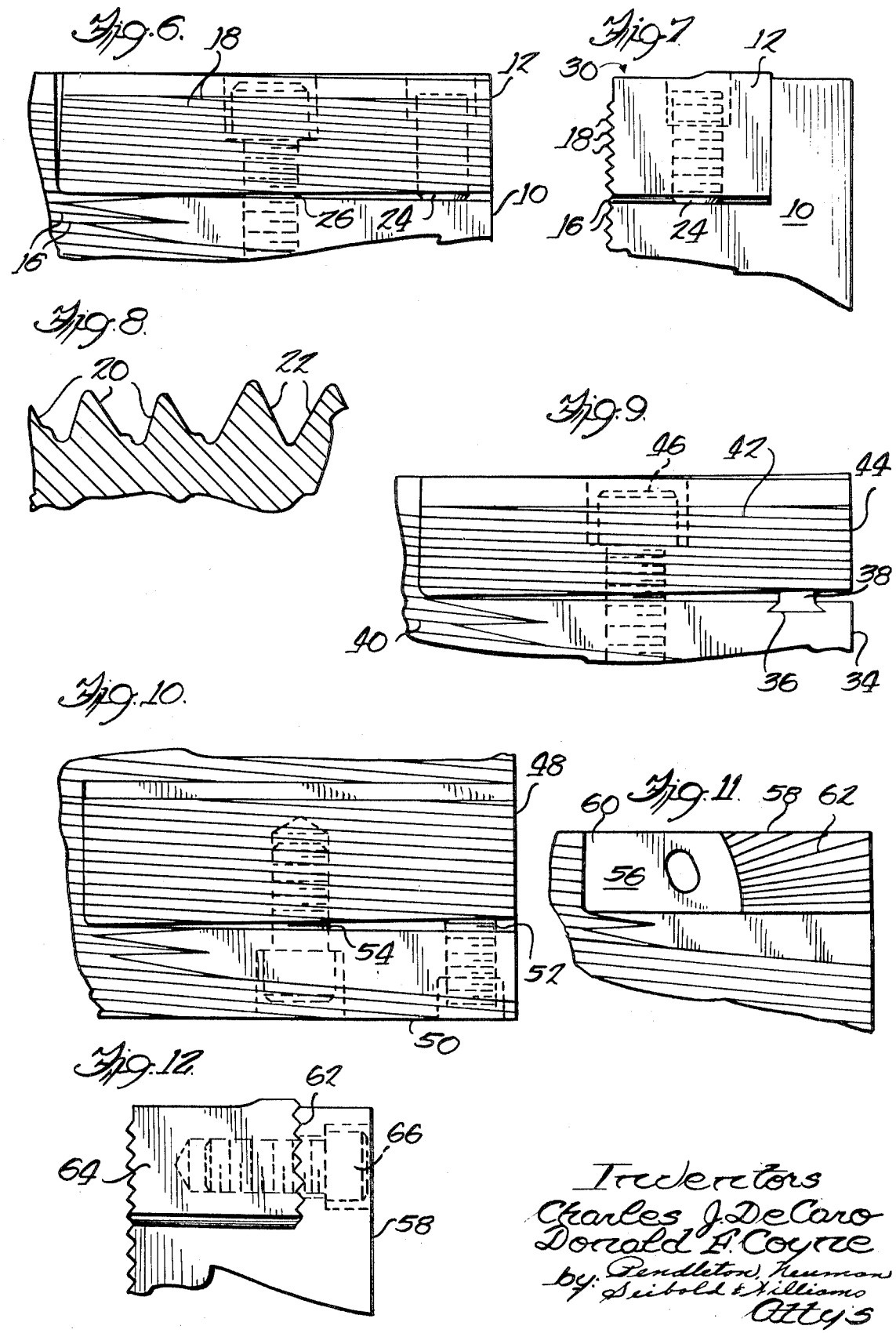

PRODUCTION OF PREVAILING TORQUE THREADED FASTENING DEVICES

BACKGROUND OF THE INVENTION

1. Field of the Invention

The present invention relates to the production of prevailing torque threaded fastening devices such as threaded pins, bolts, screws and the like in conventional roll thread machines. More particularly, it relates to a novel method and apparatus which feature a die or pair of dies which are adjustable in situ to obtain threaded fastening devices having any desired value of prevailing torque.

In roll thread machines the shank or pin to be threaded is rolled between spaced dies which move relative to each other, one of said dies usually being stationary. Each of the dies has the desired thread-forming grooves thereon, and sufficient pressure is employed to cold form the threads on the shank. For many purposes, particularly where the threaded device is subjected to a vibratory environment, it is desired that the resulting threaded fastening devices have a "prevailing torque" in addition to the "breakloose" or "breakaway" torque. The breakloose torque is that required to rotate the threaded device from its fully engaged position, whereas the prevailing torque is that required to thereafter rotate the threaded device while still engaged in the threaded aperture.

It is this prevailing torque which prevents undesired further loosening or disengagement of a threaded device after it is initially loosened. The present invention is directed to an advancement in the art of producing such prevailing torque fastening devices.

2. Description of the Prior Art

The desired prevailing torque is achieved in many instances by producing slightly deformed threads on one form or another on the threaded part. For such purposes, roll thread dies may have corresponding deformed grooves therein, skipped grooves, or equivalent nonadjustable parts for producing deformations.

To change the prevailing torque of any given thread by these previous methods, new dies must be substituted or the deformations in the existing dies reworked by removing the dies from the machine, making changes therein and replacing and realigning the opposed dies in the machine, a drawn-out and costly procedure. The accompanying shutdown, lost production, reinstallation time and requirement for skilled labor result in substantial economic penalties, lack of quality control, lack of flexibility and adjustability and uncertainty and unpredictability as to the final result.

It is therefore an object of the present invention to provide a method and apparatus which permit the precise control of the prevailing torque of threaded fastening devices by a quick and simple in situ adjustment of the roll thread die or dies used in the production thereof. It is another object to provide a method and apparatus for the production of threaded devices which feature full adjustability of prevailing torque without requiring removal of the die and the accompanying problems. It is a further object to provide a method and apparatus for the production of prevailing torque threaded fasteners wherein the resulting thread deformation may be over the entire area of engaged threads or any selected portions thereof.

It is a further object to provide a method and apparatus for producing prevailing torque threaded shanks which do not require deformation of the thread-forming grooves on the dies. It is still another object to provide a method and apparatus for the production of prevailing torque threaded fasteners which compensate for machining tolerances and the like. It is still another object to provide a roll thread die which can be readily adjusted in situ to achieve repeatability or reproducibility of prevailing torques associated therewith. It is a still further object to produce prevailing torque threaded fasteners by multiple working of the threads in a manner which may tend to cold harden the same. These and other objects of the present invention will become apparent as a detailed description proceeds.

SUMMARY OF THE INVENTION

These objects are achieved by a method and apparatus featuring a novel roll thread die and the in situ adjustment thereof to achieve a preselected prevailing torque. The die of the present invention comprises a roll thread die blank having parallel thread-forming grooves of preselected configuration on an exposed die surface thereof and, in a preferred embodiment, a depressed insert pocket in said exposed die surface providing a discontinuity in at least a portion of said thread-forming grooves. A die insert is adjustably secured in this pocket and has an exposed die surface which is substantially coextensive and coplanar with the die surface of the blank and has parallel thread-forming grooves thereon which register with corresponding grooves of the blank so as to form substantially continuous grooves therewith. The angular relationship of the thread-forming grooves on the die insert and on the die blank are adjustable from an in-line or aligned position to a position substantially varying therefrom, e.g., up to about 5° out of alignment, more typically about 0.5° to 3°.

The means for adjusting, in situ, the angular relationship of the respective grooves may take a number of forms such as are hereinafter described and equivalents thereof. A portion of the grooves on the die blank adjacent said insert or a portion of the grooves on the insert itself, or both, may be relieved (eliminated) for reasons which will become apparent from the detailed description hereinafter.

While the invention is described hereinafter by reference to specific embodiments as applied to roll thread flat dies, the invention is not limited thereto. It has equal application to planetary types of thread rolling equipment, wherein circular or round dies are employed, and equivalents. The requisite adaptations for such other embodiments will be apparent to those skilled in the art in the light of the present disclosure.

BRIEF DESCRIPTION OF THE DRAWINGS

The present invention will be more clearly understood from the following detailed description of certain specific embodiments thereof, read in conjunction with the accompanying drawings, wherein:

FIG. 1 is a perspective view of the roll thread die of the present invention with the die insert adjusted to provide a predetermined prevailing torque;

FIG. 2 is a fragmentary front elevation view showing the die insert portion;

FIG. 3 is a fragmentary overhead plan view showing the adjustment and locking screws for the die insert;

FIG. 4 is a fragmentary exploded plan view similar to FIG. 2 but with the die insert removed;

FIG. 5 is a fragmentary front elevation view on an enlarged scale showing the die insert adjusted to produce minimum prevailing torque;

FIG. 6 is a fragmentary front elevation view on an enlarged scale showing the die insert adjusted to provide a predetermined prevailing torque;

FIG. 7 is a fragmentary side elevation view on the same scale as FIG. 6;

FIG. 8 is a fragmentary section view of a prevailing torque shank produced by the method and apparatus of the present invention and shows the normal threads on the right and the distorted threads on the left; and FIGS. 9–12 depict other embodiments illustrating alternative means for changing the angular relationship between the threads on the die and the die insert.

Referring to FIGS. 1–4, the die comprises die blank 10 and die insert 12 which is locked in place in depressed insert pocket 14. Except for insert pocket 14 and associated structure, die blank 10 may be identical to prior art roll thread flat dies having parallel thread-forming grooves 16.

In conventional roll threading, the shank of the fastening device to be threaded is cold rolled under high pressure between two spaced dies having the desired thread-forming grooves thereon. One of the spaced dies is normally stationary and the other moves relative thereto, e.g., in a reciprocating relationship, in a rotational or planetary relationship, or the like. In the practice of the present invention, one or both of the conventional spaced dies are replaced with an adjustable die herein disclosed and adjusted as herein described. No special securing means or change in operations is otherwise required.

If only one die is replaced, the deformation may extend only 180° around the shank, the other die acting to "wipe out" a portion of the deformation. If such "wipe out" is undesired, both dies may be replaced with the adjustable dies of the present invention. The inserts of both dies would normally be adjusted so that their thread-forming grooves would have the same angular relationship with respect to the grooves of their respective die blanks. Controlled mechanical working of the threads could, of course, be achieved, if desired, by varying the angular relationships.

Die insert 12 has parallel thread-forming grooves 18 on the surface thereof, said surface being substantially coextensive and coplanar with the threaded surface of die blank 10. Grooves 18 are substantially identical to grooves 16 and register therewith and form a straight line continuation thereof when die insert 12 is in the zero prevailing torque position as shown in FIG. 5. when a predetermined prevailing torque is desired, however, the angular relationship between grooves 16 and 18 is changed from parallel as shown in FIG. 5 to a slight angle from parallel, e.g., up to about 5°, more typically about 0.5° to 3°, still maintaining the substantial continuity and registry of grooves 16 and 18. Such angular deviation of grooves 16 and 18 is depicted in FIG. 6, as well as in FIGS. 1, 2, 9 and 10.

Because of the slight angular deviation, the threads in contact with grooves 18 are slightly deformed, after being initially conventionally formed. The conventionally formed threads are indicated at 20 in FIG. 8. The deformed threads are indicated at 22 in FIG. 8. A comparison of threads 20 and 22 indicates the substantial cold working which takes place when the normally shaped threads formed by grooves 16 contact grooves 18 of insert 12. The additional cold working of the metal to achieve the depicted deformation may enhance the metallurgical properties of the threads. The amount of prevailing torque depends on the extent of thread deformation, which in turn depends on the angular relationship between grooves 16 and 18.

The angular relationship of grooves 18 relative to grooves 16 is readily adjustable by means of adjustment screw 24 in a threaded bore in insert 12. To produce a prevailing torque fastener, the lower end of screw 24 is extended below the lower surface of insert 12 so as to bear against the upper surface of pocket 14. Insert 12 is then locked into the selected position by tightening lock screw 26 in insert 12, which is threaded into die blank 10. Insert 12 thus is rigidly held against the corner of the pocket at the one extremity and a position fixed by adjustment screw 24 at the other extremity.

For clearance and ease of adjustment, the upper ends of adjustment screw 24 and lock screw 26 are recessed below the upper surface of insert 12 and are provided with hexagonal receptacles for hexagonal key wrenches. As shown in FIG. 5, the mating surfaces at the left of pocket 14 and insert 12 are relieved somewhat (e.g., about 3° to 5°), as indicated by the clearance 28, to permit the insert to be rotated through several degrees as screw 24 is adjusted to achieve whatever prevailing torque is desired.

As those skilled in the art will recognize, insert 12 can be adjusted in situ without removing the die from the roll thread machine. Lock screw 26 and adjustment screw 24 are completely accessible. To change the prevailing torque, it is only necessary to stop the machine, loosen the lock screw 26, extend or retract adjustment screw 24 as desired to increase or decrease the prevailing torque, respectively, retighten lock screw 26 and recommence operations. This avoids the previous drawn-out and costly procedures characteristic of prior art techniques.

As best shown in FIG. 7, the top of insert 14 may be relieved or shaved off somewhat, as indicated by arrow 30, to provide clearance, if necessary, for the head of the fastening device being threaded. This is particularly necessary when insert 12 is employed in its uppermost positions, that is, when adjustment screw 24 is extended to its maximum or lowermost positions.

Another attribute of the present invention is the ability to locate the thread deformation over the entire threaded area or any selected portions thereof. In the embodiment of FIGS. 1–7, the threads on the upper portion of the shank corresponding to those contacted by the grooves 18 of insert 12 would be deformed, whereas lower threads would not be. To assure that the lower threads are not deformed, grooves 16 are relieved in the area indicated by arrow 32 in FIGS. 1, 2 and 4.

The angular 9, be established by other techniques as indicated in FIGS. 9–12, or equivalents thereof. It should be understood, of course, that the various depicted techniques are for illustrative purposes only, and the invention is not limited thereto.

In FIG. 9, die blank 34 has slot 36 thereon into which a replaceable shim 38 may be placed. By changing the size of shim 38 in situ, the angular relationship of grooves 40 on blank 34 and grooves 42 on insert 44 and the resulting prevailing torque may be changed. This embodiment has the attribute of substantial reproducibility of prevailing torque for any given shim. Insert 44 is locked in place, as in the embodiment of FIGS. 1–7 by locking screw 46.

Alternative locations for the insert and adjusting and locking screws are shown in FIG. 10. Here the insert 48 is at an intermediate position of the die blank 50, whereby the deformed threads are located at an intermediate position on the shank. The angular relationship is established by the position of adjustment screw 52, the insert 48 then being locked into place by lock screw 54.

Another technique for assuring reproducibility of results shown in FIGS. 11 and 12, wherein the pocket 56 in blank 58 is located as in FIGS. 1–7. The interior wall 60 of pocket 56 has a radially grooved surface which registers with identical grooves on the inner wall of insert 64. Lock screw 66 in the back wall of blank 58 is threaded into insert 64 and holds the insert in place. The angular relationship is adjusted by changing the registering radial grooves of insert 64 and blank 58.

It is apparent from the above description that the present invention permits for the first time the interchangeable production of threaded fastening devices having a plurality of predetermined different prevailing torques on a conventional roll thread machine by simple, rapid, in situ adjustments. For example, in the embodiment of FIGS. 1–7, after adjusting the angular relationship of the respective grooves on the die blank and die insert and producing threaded devices of a given prevailing torque, the torque may be readily increased or decreased (or maintained constant despite die wear) as desired by simply loosening the lock screw, threading the adjustment screw out or in, respectively, as the case may be, and retightening the lock screw. To obtain reproducibility of torque, the adjustment screw may be indexed or other appropriate indicia of position employed. Trial and error may also be resorted to in order to obtain a desired prevailing torque, as is apparent in the light of the above description.

The present invention will be more clearly understood from the examples hereinafter set forth.

EXAMPLES

The "on," "breakaway" and "prevailing" torques of a series of hexagonally headed machine screws (or bolts), identified in the accompanying tabulation as screws A through O, manufactured in accordance with the present invention, were determined using techniques known to those skilled in the art. In these tests, ½-inch steel machine screws having 13 threads per inch were employed. The screws were manufactured using a flat die thread rolling machine wherein one of the two conventional flat dies was replaced with a die substantially identical to that illustrated in FIGS. 1–7. In each test the die insert was adjusted to obtain prevailing torques of the magnitude indicated in the tabulation.

Screws A through D were not heat treated or plated. Screws E through O were heat treated, plated with cadmium and contacted with yellow dichromate. The test nuts were not heat treated. In the tests of screws C through O the test nuts were manufactured to closer tolerances than the test nuts used in the tests of screws A and B.

In most instances data were obtained for five successive cycles, that is, the screw was seated against the test nut and then unthreaded five successive times, the "on" "breakaway" and "prevailing" torques being measured each time. The torque measurements were made using a Sturteyvant torque wrench and motor-driven drive.

In the following tabulation, the label "On/Break./Prev. Torques" refers, respectively, to the on torque, the breakaway torque and prevailing torque for that given cycle, torques being measured in inch-pounds. Where dashes appear in the tabulation, data were not obtained.

TEST RESULTS

| Screw | 1st cycle On/break./prev. torques, in.-lbs. | 2nd cycle On/break./prev. torques, in.-lbs. | 3rd cycle On/break./prev. torques, in.-lbs. | 4th cycle On/break./prev. torques, in.-lbs. | 5th cycle On/break./prev. torques, in.-lbs. |
|---|---|---|---|---|---|
| A | 200/220/30 | —/180/20 | —/172/20 | —/160/15 | —/160/10 |
| B | 220/212/40 | —/168/30 | —/162/25 | —/160/25 | —/155/25 |
| C | 120/122/55 | —/92/45 | —/105/45 | —/80/40 | —/105/45 |
| D | 135/135/45 | —/110/30 | —/105/30 | —/100/25 | —/90/25 |
| E | 242/238/70 | —/—/— | —/—/— | —/—/— | —/—/— |
| F | 250/290/55 | —/240/35 | —/130/30 | —/200/20 | —/185/15 |
| G | 235/265/80 | —/215/65 | —/240/50 | —/220/52 | —/218/50 |
| H | 225/260/55 | —/—/60 | —/192/52 | —/203/55 | —/135/35 |
| I | 255/295/100 | —/210/60 | —/242/55 | —/245/53 | 235/270/54 |
| J | 230/242/45 | 205/240/45 | 220/260/50 | 215/252/45 | 230/278/50 |
| K | 232/275/90 | 240/258/82 | 230/260/70 | 230/250/72 | 228/260/80 |
| L | 240/272/98 | 250/250/95 | 238/258/92 | 235/205/80 | 248/265/94 |
| M | 228/240/130 | 238/285/140 | 232/258/120 | 239/260/120 | 232/220/135 |
| N | 185/212/55 | 175/200/55 | 158/190/40 | 185/215/60 | 180/212/50 |
| O | 97/100/10 | 160/180/80 | 168/182/80 | 168/190/75 | 180/205/80 |

These data illustrate the efficacy of the present invention for producing threaded bolt fastening devices having substantial prevailing torque even after successive cycles. For example, when using heat treated screws E through O, and attempting to meet the specification of a minimum of twenty-two inch-pounds of prevailing torque on the first cycle and a minimum of fifteen inch-pounds on the fifth cycle, every one of the screws met the specification.

From the above description and examples, it is apparent that the objects of the present invention have been achieved. While only a few embodiments have been illustrated, many alternative embodiments and modifications thereof will be apparent from the above description to those skilled in the art. For example, while in the illustrated embodiments the die insert is recessed into a depressed pocket in the die blank, it is quite apparent that the insert can be adjustably mounted as an extension of the die blank, or as an insert in a completely removed portion of the die blank, or the like. These and other alternatives are considered within the spirit and scope of the present invention, and coverage thereof is intended by this application.

We claim:

1. A roll thread die for manufacturing externally threaded fastening devices of adjustable prevailing torques, comprising in combination:
   a. a roll thread die blank having thread-forming grooves of preselected configuration on an exposed die surface thereof;
   b. a die insert adjustably securable to said die blank and having an exposed die surface substantially coextensive with the exposed die surface of said blank and having substantially identical thread-forming grooves thereon which register with corresponding thread-forming grooves of said blank so as to form substantially continuous grooves therewith; and
   c. adjustment means changing, in situ, the angular relationship of the thread-forming grooves on said die insert and the thread-forming grooves on said die blank while maintaining the substantial continuity of the grooves.

2. The roll thread die of claim 1 wherein a portion of the grooves on said blank adjacent said insert is relieved.

3. The roll thread die of claim 1 wherein a portion of the grooves on said die insert is relieved.

4. The roll thread die of claim 1 wherein said insert is pivotally supported at the thread registering extremity thereof and said means for changing the angular relationship comprises an adjustable support adjacent the opposite end of said insert and an intermediate fastening means for rigidly securing said insert against the pivotal area and said adjustable support.

5. The roll thread die of claim 4 wherein said adjustable support comprises a threaded adjustment screw and said intermediate fastening means comprises a threaded locking screw.

6. A method of interchangeably producing threaded fastening devices having a plurality of predetermined different prevailing torques on a roll thread machine, which method comprises the steps of:

a. employing in said roll thread machine a roll thread die having a movably-secured die insert in the thread-forming face thereof and thread-forming grooves extending over the thread-forming face including said die insert, and adjustment means whereby the angular relationship of the thread-forming grooves on said die insert may be changed relative to the remainder of the grooves while maintaining the substantial continuity and registry of the grooves;
   b. adjusting, in situ, said angular relationship of the respective grooves by said adjustment means to correspond a first predetermined prevailing torque;
   c. producing threaded devices on said machine with said angular relationship so adjusted;
   d. thereafter readjusting, in situ, said angular relationship of the respective grooves by said adjustment means so as to achieve a second predetermined prevailing torque; and
   e. thereafter producing threaded devices on said machine with said angular relationship so readjusted.

7. A method of producing on a roll thread machine threaded fastening devices having a preselected desired prevailing torque comprising:

a. employing in said roll thread machine a roll thread die comprising:
      1. a roll thread die blank having thread-forming grooves of preselected configuration on an exposed die surface thereof,
      2. a die insert adjustably securable to said die blank and having an exposed die surface substantially coextensive with the exposed die surface of said blank and having identical thread-forming grooves thereon which register with corresponding grooves of said blank so as to form substantially continuous grooves therewith, and
      3. adjustment means for changing, in situ, the angular relationship of the thread-forming grooves on said die insert and the thread-forming grooves on said die blank while maintaining a substantial continuity of the grooves, the adjustment means comprising an adjustable support adjacent the outer extremity of the die insert whereby said die insert may be pivotally raised and an intermediate fastening means for rigidly securing said insert against the area of pivoting and said adjustable support;
b. setting said adjustment means at a preselected point;
c. producing threaded devices on said machine with such adjustment of said adjustment means and determining the prevailing torque of the resulting threaded devices in comparison with the preselected desired prevailing torque;
d. adjusting said adjustment means to change the prevailing torque in the direction of the preselected desired prevailing torque;
e. again producing threaded devices and again determining the prevailing torque of the resulting threaded devices; and
f. repeating steps *d* and *e* until the preselected desired prevailing torque is achieved.

UNITED STATES PATENT OFFICE
CERTIFICATE OF CORRECTION

Patent No. 3,602,026   Dated  August 31, 1971

Inventor(s) Charles J. DeCaro and Donald F. Coyne

It is certified that error appears in the above-identified patent and that said Letters Patent are hereby corrected as shown below:

It is certified that error appears in the above-identified patent and that said Letters Patent is hereby corrected as shown below:

Column 3, line 24, "when" should read --When--;

Column 3, line 28, before "still" insert --while--;

Column 3, line 68, before "lock screw" delete "the";

Column 4, line 13, after "angular" delete "9," and insert --relationship of the grooves on the die blank and die insert may--;

Column 4, line 35, before "shown" insert --is--;

Column 5, line 72, before "changing" insert --for--.

Signed and sealed this 28th day of March 1972.

(SEAL)
Attest:

EDWARD M. FLETCHER, JR.
Attesting Officer

ROBERT GOTTSCHALK
Commissioner of Patents